United States Patent [19]

Fischer et al.

[11] Patent Number: 5,157,715

[45] Date of Patent: Oct. 20, 1992

[54] CALL STATUS RECOGNITION IN A BROADBAND PRIVATE AUTOMATIC BRANCH EXCHANGE

[75] Inventors: Oliver Fischer, Weil der Stadt; Guido Linsenmaier, Ispringen, both of Fed. Rep. of Germany

[73] Assignee: Alcatel N.V., Amsterdam, Netherlands

[21] Appl. No.: 648,490

[22] Filed: Jan. 31, 1991

[30] Foreign Application Priority Data

Feb. 1, 1990 [DE] Fed. Rep. of Germany ....... 4002861

[51] Int. Cl.$^5$ .......................................... H04M 11/00
[52] U.S. Cl. .................................................. 379/90
[58] Field of Search ...................... 379/53, 54, 90, 110, 379/164; 358/85

[56] References Cited

U.S. PATENT DOCUMENTS 3,684,833  8/1972  Bush et al. ............................ 379/54
4,638,124  1/1987  Hargrave et al. ................... 379/164

Primary Examiner—James L. Dwyer
Assistant Examiner—Wing F. Chan
Attorney, Agent, or Firm—Brunell & May

[57] ABSTRACT

In a broadband private automatic branch exchange (BB-PABX) in which a plurality of broadband terminals (BB-E1, ..., BB-E26) are connected to a broadband switching array (BB-V) to switch video and data signals, the current call status of the system must be signaled to the terminals, so that a broadband connection may be activated. For this purpose, a message characterizing a quiescent state is supplied to one input/output (O) of the broadband switching array (BB-V) of the private automatic branch exchange and all nonswitched input/output (1, 2, ..., 30) controlled by an associated control unit (C) are linked with the first input/output (O) so that the quiescent state message is always transmitted to all nonswitched terminals.

5 Claims, 1 Drawing Sheet

CALL STATUS RECOGNITION IN A BROADBAND PRIVATE AUTOMATIC BRANCH EXCHANGE

TECHNICAL FIELD

The invention concerns a circuit arrangement for signaling a call status of a broadband private automatic branch exchange to a plurality of broadband terminals connected to a broadband switching array of the broadband private automatic branch exchange for switching video and data signals.

CLAIM FOR PRIORITY

This application is based on and claims priority from German Patent Application No. 40 02 861.5 dated Feb. 1, 1990. To the extent such prior application may contain any additional information that might be of any assistance in the use and understanding of the invention claimed herein, it is hereby incorporated by reference.

BACKGROUND ART

The public broadband switching network (VBN) of the German Bundespost permits transmission of image and voice in television quality at a bit rate of 140 mbit/s. The VBN represents a broadband direct dial network for a large number of subscribers with broadband terminals, such as video telephones and video conferencing equipment. Each subscriber is linked to the VBN via a subscriber connection unit TAE which converts the 140 mbit/s signals into audio, video, and data signals. The TAE contains function modules for control, A/D converters, multiplexers/demultiplexers, and line termination units, with the TAE controller being available for call setup. By means of such a VBN connection, it is also possible to operate a private automatic branch exchange having a plurality of user stations ("Automatic Direct Dialing Instead of Person-to-Person Calling", by E. Fischer and P. Pernsteiner, FUNKSCHAU, Vol. 5 (1989), p 30 ff.)

DISCLOSURE OF INVENTION

The object of the invention is to provide a circuit arrangement for signaling the call status of the private automatic branch exchange to the broadband terminals, in order to be able to set up a broadband connection with broadband terminals of a private automatic branch exchange.

In accordance with the invention, there is generated a message characteristic of a quiescent state which is transmitted via a first output of the broadband switching array to all nonswitched input/outputs of the switching array and thus to all nonswitched broadband terminals, thereby signaling the "nonswitched" status to the nonswitched broadband terminals. The presence of a connected broadband call is indicated simply by the absence of this message.

BRIEF DESCRIPTION OF DRAWINGS

One exemplary embodiment is explained in the following with the help of the drawing.

The drawing depicts a block diagram of a broadband private automatic branch exchange including the circuit arrangement according to the invention.

BEST MODE FOR CARRYING OUT THE INVENTION

Figure 1:
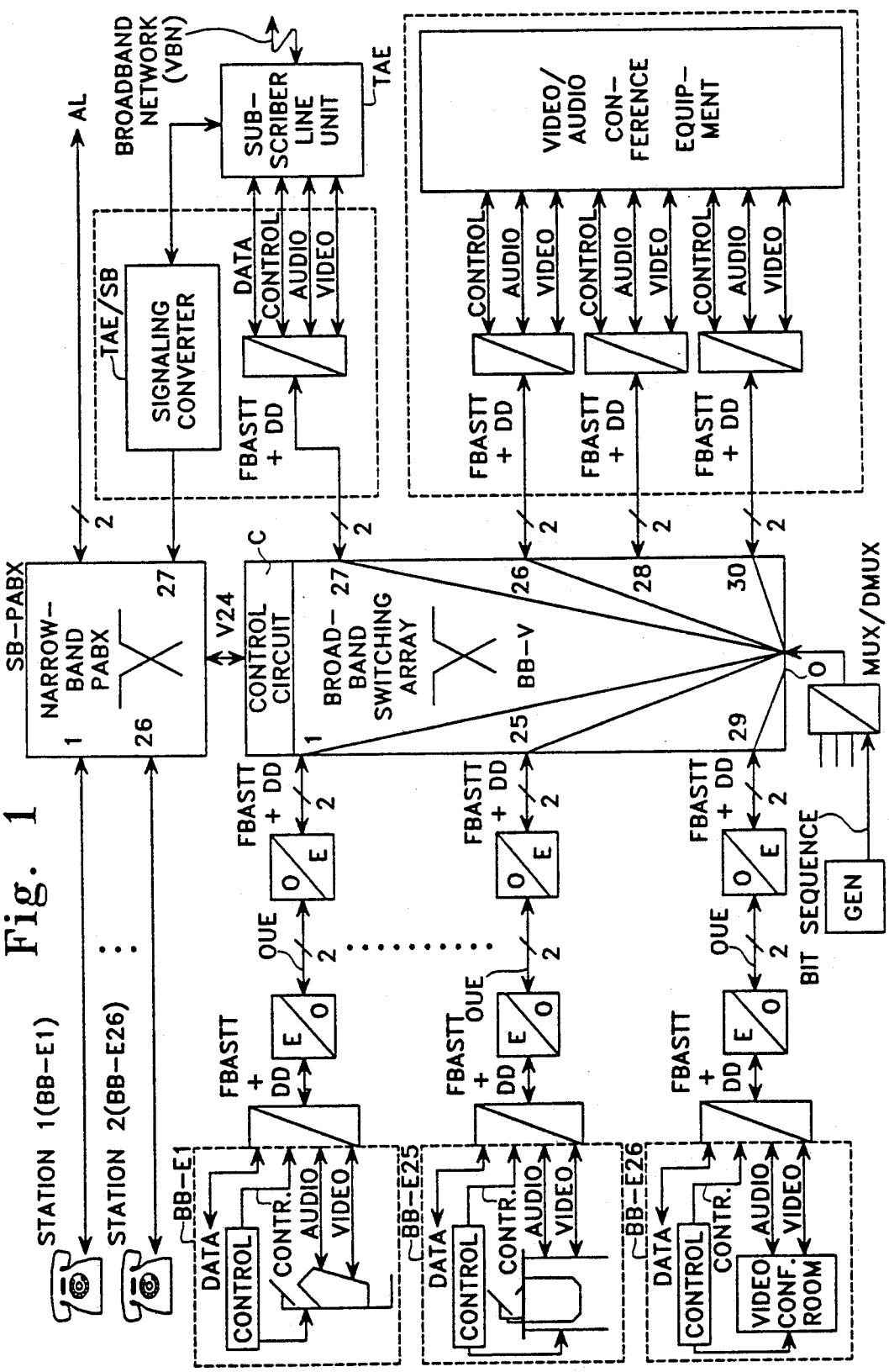

A private automatic branch exchange BB-PABX, as shown in the figure, consists of an analog broadband switching array BB-V with which a control unit C is associated. The broadband switching array BB-V is essentially a multi-dimensional matrix structure with 32 input/outputs for the broadband signals to be switched. Besides the associated control unit C, decoders to address the crosspoints, memories to store the setup or release data, and a serial interface (V24) for control data are present. A broadband switching array BB-V such as is contemplated in the exemplary embodiment, can be obtained from the company SVT Video Systems, Ltd., Essex, England under the name AVS 264 Video Matrix.

Twenty-six broadband terminals designated BB-E1 through BB-E26 are connected to the input/outputs designated 1 through 26 of the broadband switching array BB-V, as shown in the figure, each via an optical transmission line OUE into which corresponding electro/optical E/O and optical/electric converters O/E are incorporated.

The signal connected via the broadband switching array consists of a video signal with two audio channels FBASTT, and also consists of two data channels DD, and is converted for further processing in each terminal BB-E1, . . . , BB-E26 via appropriate multiplexers/demultiplexers.

The broadband terminals can be, for example, video telephones, multifunction video workstations, or even a video conference room. To set up video conferencing connections, a video conference set is connected via multiplexers/demultiplexers to the input/outputs 28 through 30 of the broadband switching array BB-V as for the broadband terminals.

An additional input/output 27 of the broadband switching array BB-V is linked via an appropriate multiplexer/demultiplexer with a subscriber line unit TAE for a broadband switching network VBN of the German Bundespost, to permit the setup of external broadband connections. Additionally, the broadband switching array BB-V is linked via the V24 serial interface with a narrow band, i.e. a telephone, private automatic branch exchange SB-PABX, since each connection is set up first conventionally via a telephone connection. Thus, the 26 user stations are also connected to the telephone private automatic branch exchange SB-PABX, as completely "normal" narrow band telephone user stations, who can be linked, on the one hand, according to the prior art via trunk lines AL with the public telephone network and which can be linked, on the other hand, via an additional connection 27 and via an appropriate interface to the signaling converter TAE/SB with the subscriber line unit TAE for the broadband network VBN. For this, only the user stations equipped with broadband terminals BB-E1, . . . , BB-E26 are authorized to make connections via the broadband network VBN.

To be able to set up an internal or an external broadband connection, first a narrow band telephone connection is made in the prior art fashion via the telephone exchange SB-PABX.

In order to be able to activate a broadband connection via the broadband switching array BB-V, the broadband terminal must receive a signal of the current call status, i.e., a message that a connection via the broadband switching array BB-V exists (or does not exist). For this, the circuit arrangement according to the invention has a unit GEN which generates a message characteristic of a quiescent state. This unit may assume the form of a bit generator GEN which generates an arbitrary, predetermined bit sequence. This bit sequence, hereinafter referred to as the quiescent bit sequence, can, for example, be a simple ASCII string. Advantageously, the bit generator GEN is a part of the control unit C controlling the broadband switching array BB-V.

The bit generator GEN is linked via a data channel with a multiplexer/demultiplexer converting the data channel, as well as a video channel, and an associated audio channel, which multiplexer/demultiplexer is connected to the first input/output O of the broadband switching array BB-V.

In accordance with the invention, the control unit C, which receives signals of all call attempts via the V24 serial interface, connects the first input/output O with all the nonswitched input/outputs of the broadband switching array BB-V.

Thus the quiescent bit sequence supplied by the bit generator GEN via the data channel is transmitted to all nonswitched broadband terminals. In accordance with the invention, this permits simple monitoring of the call status of the private automatic branch exchange by detection of the presence of the Yes/No quiescent status bit sequence.

If the absence of the quiescent bit sequence is detected during the setup of a broadband call, which signifies a connection has already been set up with the designated second broadband user via the broadband switching array BB-V, the first user may complete the connection for the transmission/reception of a broadband signal, i.e. image and audio signal of extremely high quality, by activating an appropriate key on the broadband terminal.

Instead of a quiescent bit sequence generated by the bit generator GEN, as described in the above exemplary embodiment, any other messages, such as an audio or a video message, are also suitable to signal a "nonswitched" status. Such an audio or video message can be generated simply by means of an audio generator or a video signal generator and applied appropriately via the multiplexer/demultiplexer to the first input/output O of the broadband switching array BB-V.

We claim:

1. Apparatus for signaling a call status of a broadband private automatic branch exchange to a plurality of broadband terminals, said apparatus comprising:
    a broadband switching array for selectively coupling video and data signals between a plurality of inputs/outputs,
    a signal unit for applying a quiescent signal characteristic of a nonswitched state to a first input/output of the broadband switching array, and
    a control unit connected to the switching array for causing said switching array to couple to said first input/output any nonswitched inputs/outputs not currently coupled by said broadband switching array to another of said inputs/outputs, whereby said quiescent signal is transmitted to all nonswitched broadband terminals.

2. A circuit arrangement according to claim 1, wherein said signal unit which generates a message characteristic of a quiescent is a bit generator which generates an arbitrary, predetermined bit sequence.

3. A circuit arrangement according to claim 2, wherein the bit generator forms part of the control unit.

4. A circuit arrangement according to claim 2, wherein the bit generator is connected to the first input of the switching array via a data channel and a multiplexer/demultiplexer for the data channel, an audio channel, and a video channel.

5. A circuit arrangement according to claim 1, wherein the signal unit is a sound generator or a video-signal generator.

* * * * *

UNITED STATES PATENT AND TRADEMARK OFFICE
CERTIFICATE OF CORRECTION

PATENT NO. : 5,157,715
DATED : October 20, 1992
INVENTOR(S) : Oliver Fischer; Guido Linsenmaier It is certified that error appears in the above-identified patent and that said Letters Patent is hereby corrected as shown below:

Column 4, lines 24,25, delete "which generates a message characteristic of a quiescent".

Signed and Sealed this

Nineteenth Day of October, 1993

*Attest:*

BRUCE LEHMAN

*Attesting Officer*     *Commissioner of Patents and Trademarks*